United States Patent

[11] 3,613,735

| [72] | Inventor | Edwin A. Ostrowski<br>Mount Prospect, Ill. |
|---|---|---|
| [21] | Appl. No. | 49,763 |
| [22] | Filed | June 25, 1970 |
| [45] | Patented | Oct. 19, 1971 |
| [73] | Assignee | Controls Company of America<br>Melrose Park, Ill. |

[54] MOUNTING FOR FLOW CONTROL AND OUTLET NIPPLE ON WATER VALVE
5 Claims, 4 Drawing Figs.

[52] U.S. Cl.................................................... 138/45,
285/40, 138/46
[51] Int. Cl...................................................... F15d
[50] Field of Search............................................ 138/45, 46;
285/40, 209; 137/525

[56] References Cited
UNITED STATES PATENTS

| 2,454,929 | 11/1948 | Kempton...................... | 138/45 |
| 3,050,086 | 8/1962 | Honsinger..................... | 132/45 |
| 3,444,897 | 5/1969 | Erickson....................... | 132/45 |

*Primary Examiner*—Herbert F. Ross
*Attorneys*—John W. Michael, Gerrit D. Foster, Bayard H. Michael, Paul R. Puerner, Joseph A. Gemignani, Andrew O. Riteris and Spencer B. Michael ABSTRACT: The outlet fitting provides an internal seat for the flow control washer and is retained in the valve body by the splined shear plate which is pressed against the fitting to compress the gasket and then rotated to shear through the internal projections or splines in the body.

3,613,735
PATENTED OCT 19 1971
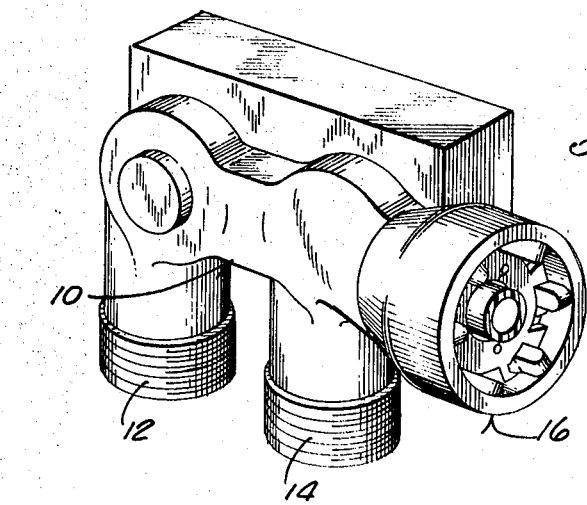
Fig. 1
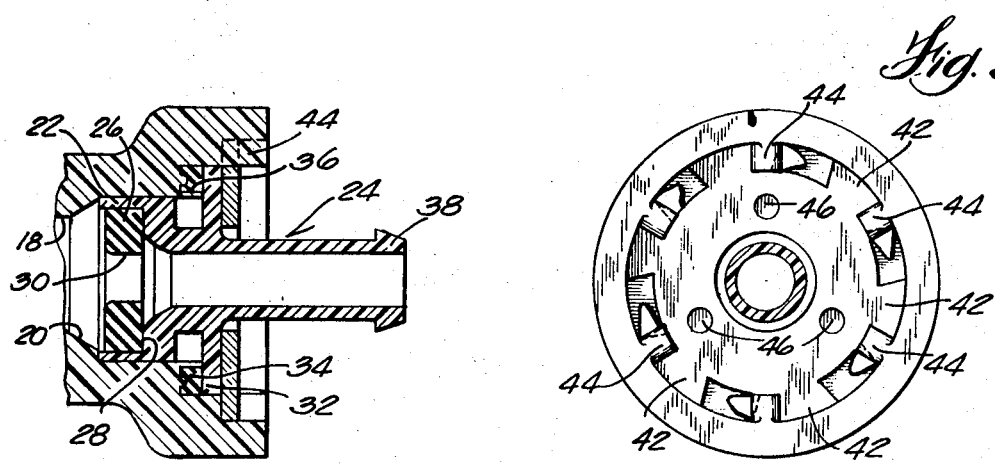
Fig. 3
Fig. 2
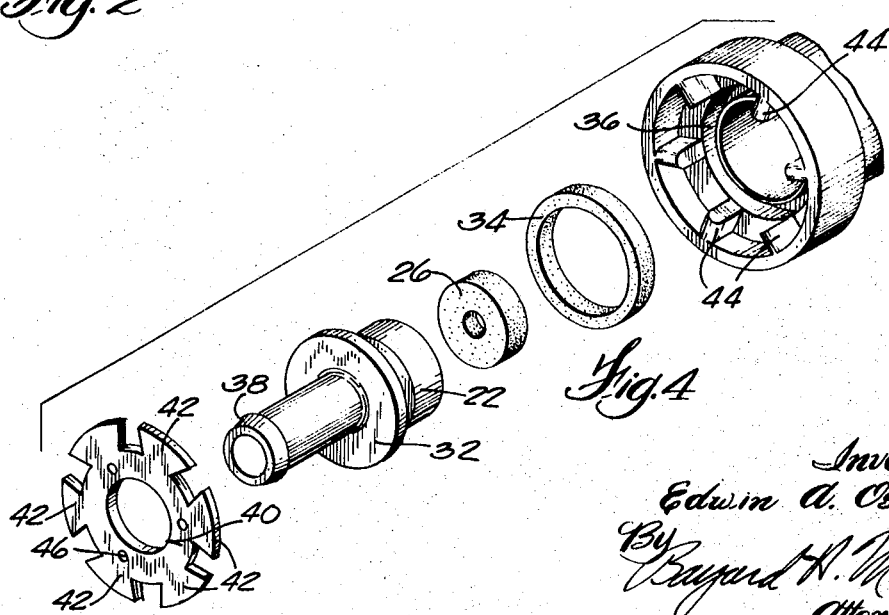
Fig. 4
Inventor
Edwin A. Ostrowski
By Bayard H. Michael
Attorney

MOUNTING FOR FLOW CONTROL AND OUTLET NIPPLE ON WATER VALVE

BACKGROUND OF INVENTION

Water valves of this general type are extensively used in the appliance industry. The retention of flow control washers in the body has employed pockets or fittings which had to be sealed and retained usually by screws. The nature of the design is such that frequently different bodies were used depending upon whether a flow control was required.

SUMMARY OF INVENTION

The assembly described in the Abstract is simple and fast while minimizing assembly costs and failures by reason of inadequate sealing. The flow control washer can be omitted without affecting the assembly other than using a bit more material in the body that would be required in the case of a plain (no flow control) outlet. Some situations justify the added material cost in preference to the tooling of separate design.

DESCRIPTION OF DRAWINGS

FIG. 1 is a perspective view of the valve body with the coils omitted.

FIG. 2 is an axial section through the outlet fitting.

FIG. 3 is an end view of Fig. 2 from the right in FIG. 2.

FIG. 4 is an exploded perspective view illustrating the method of assembly.

DESCRIPTION OF PREFERRED EMBODIMENT

The valve body 10 has hot and cold inlets 12, 14 leading to the usual valves (not shown) for delivery to outlet 16. The bore 18 flares at 20 to receive the skirt 22 of outlet fitting 24. Flow control washer 26 seats in the skirt portion 22 against annulus 28 to deform under increasing pressure to restrict the orifice to maintain the flow rate relatively constant. The outlet fitting includes a shoulder 32 which compresses gasket 34 in grove 36 and the projecting nipple 38 to which connection can be made. The fitting 24, gasket 34, and the flow control washer 26 are retained by the splined shear plate 40.

The projections or splines 42 of plate 40 can slide between the internal splines or projections 44 inside the outlet 16 until the plate is firm against shoulder 32 with the gasket 34 compressed. At this time a tool engaging the three holes 46 in the plate rotates the plate to shear the plate projections 42 through the outlet splines 44 leaving the projections interlocked. The bore splines 44 are relatively thinner than the plate splines so the force to shear through the bore splines is low and subsequent "registerry" of the splines is not critical. The root radius of the plate is slightly less than the radius to the inside of the bore splines 44 so the plate remains centered and cannot distort the nipple during mounting.

This results in a very low cost method of mounting the flow control washer in the valve body. Since the gasket can be compressed considerably before the shear plate is locked into the body, leakage problems are virtually non existent. The washer can be left out without affecting the quality of the construction.

I claim:

1. A water valve having a body including an outlet bore,
   an outlet fitting in the bore and including a nipple having an outlet conduit,
   a flow control device positioned in the outlet fitting, said bore having internal splines,
   a plate having a central aperture fitting over the nipple and splines mating with the bore splines,
   said plate acting to hold the fitting in the bore and being rotated slightly so its splines shear into the bore splines to lock the plate, the fitting, and the flow control device in the bore.

2. An assembly according to claim 1 in which the bore has an internal shoulder and the fitting has an annular shoulder overlying the bore shoulder,
   a gasket between the shoulders compressed when the plate is mounted, said plate acting against the fitting shoulder.

3. An assembly according to claim 2 in which the root radius of the plate is slightly less that the radius of the bore splines to keep the plate centered and avoid distortion of the nipple.

4. An assembly according to claim 3 in which one of the shoulders has an annular groove in which the gasket is mounted.

5. An assembly assembly according to claim 4 in which said bore is flared and the fitting is received in the larger portion with the flow control device captured between the fitting and the smaller diameter portion of the bore.